US009272253B2

(12) United States Patent
Kooi

(10) Patent No.: US 9,272,253 B2
(45) Date of Patent: Mar. 1, 2016

(54) MOBILE TANK CONTAINER PROVIDED WITH A VALVE GEAR FOR ALLOWING CIRCULATION OF A LIQUID

(75) Inventor: Eeuwe Durk Kooi, Noordwijk (NL)

(73) Assignee: TRS Transportkoeling B.V., Noordwijk (NL)

( * ) Notice: Subject to any disclaimer, the term of this patent is extended or adjusted under 35 U.S.C. 154(b) by 960 days.

(21) Appl. No.: 13/473,380

(22) Filed: May 16, 2012

(65) Prior Publication Data

US 2012/0292326 A1  Nov. 22, 2012

(30) Foreign Application Priority Data

May 20, 2011 (NL) .................................... 2006822

(51) Int. Cl.
*B01F 13/00* (2006.01)
*B01F 9/08* (2006.01)
*B01F 11/00* (2006.01)
*B60P 3/22* (2006.01)
*B01F 9/00* (2006.01)

(52) U.S. Cl.
CPC ............... *B01F 13/0035* (2013.01); *B01F 9/08* (2013.01); *B01F 11/0022* (2013.01); *B60P 3/2235* (2013.01); *B01F 2009/0092* (2013.01)

(58) Field of Classification Search
CPC ............... B01F 9/08; B01F 2009/0092; B01F 13/0035; B60P 3/2235
USPC .......................................... 366/224, 225, 228
See application file for complete search history.

(56) References Cited

U.S. PATENT DOCUMENTS

| 4,136,973 A * | 1/1979 | van der Lely ................. 366/219 |
| 9,061,623 B2 * | 6/2015 | MacLean et al. |
| 2012/0292326 A1 * | 11/2012 | Kooi ............................. 220/562 |

FOREIGN PATENT DOCUMENTS

| DE | 202012004698 U1 * | 8/2012 |
| EP | 2412647 A1 * | 2/2012 |
| GB | 679132 | 9/1952 |
| GB | 1274003 | 5/1972 |
| WO | WO2005121310 | 12/2005 |
| WO | WO2008104588 | 9/2008 |

* cited by examiner

*Primary Examiner* — Charles Cooley
(74) *Attorney, Agent, or Firm* — Marcus C. Dawes; Daniel L. Dawes

(57) ABSTRACT

A mobile tank container arranged to transport a liquid, comprising a circumferential wall which extends around an axis in a driving direction of the mobile tank container and two end walls which close the container volume at the front side and the rear side, wherein the tank container is provided with a valve gear comprising at least one valve which extends into the container volume, such that the valve, when used while the tank container is at least substantially full with liquid, comparatively allows circulation of liquid in the container volume in one tangential circulation direction around the axis or in one axial circulation direction along the axis, or a combination of the two directions, in the open position thereof, and that the valve comparatively impedes circulation of liquid in the opposite circulation direction in the closed position thereof.

8 Claims, 1 Drawing Sheet

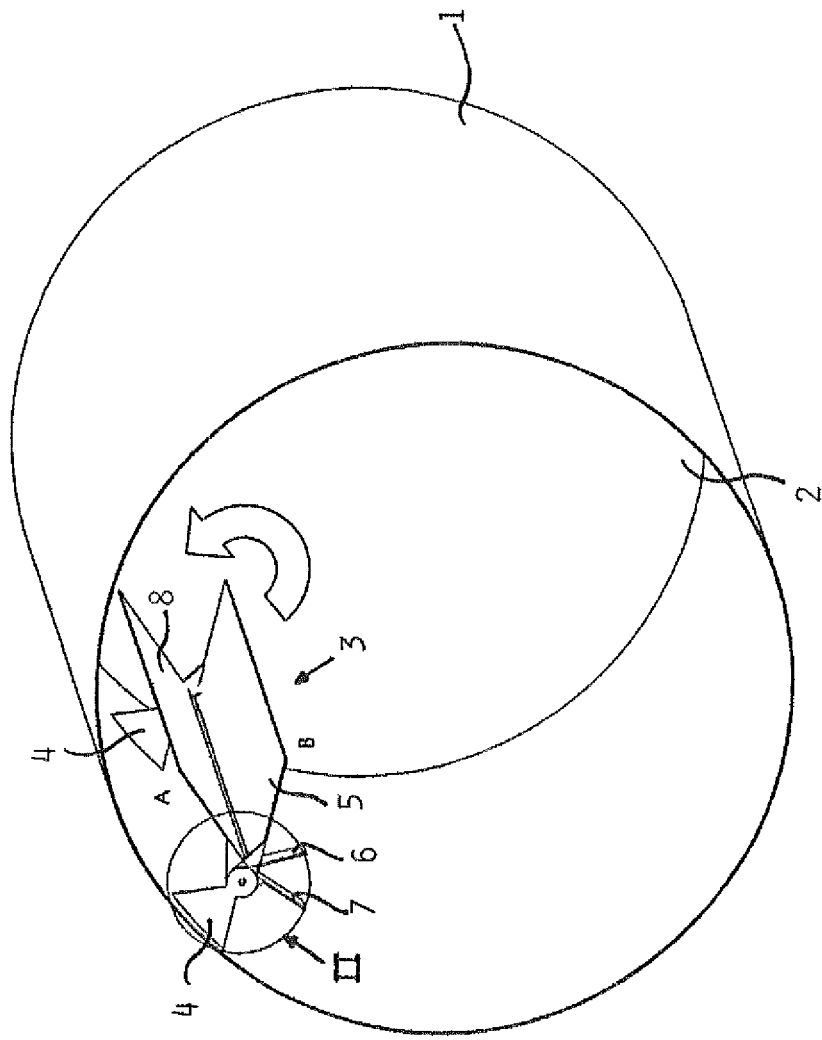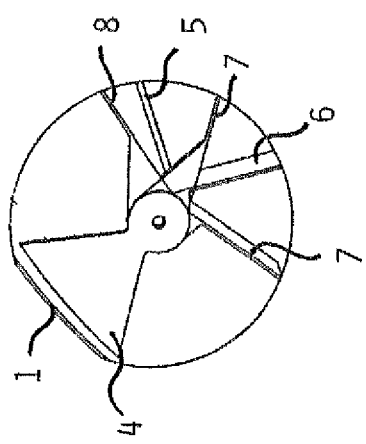
FIG. 1
FIG. 2

MOBILE TANK CONTAINER PROVIDED WITH A VALVE GEAR FOR ALLOWING CIRCULATION OF A LIQUID

BACKGROUND

1. Field of the Invention

The present invention relates to a mobile tank container for transporting a liquid, comprising a circumferential wall which extends around an axis in a driving direction of the mobile tank container and which surrounds a container volume, and two end walls which, seen in the driving direction, close the container volume at the front side and the rear side.

2. Description of the Related Art

Such a mobile tank container is generally known, for example in the form of a truck tank container or a rail tank container, and typically has a capacity of 22,000-35,000 liters. The tank container is mounted on a driveable undercarriage, wherein the circumferential wall is mounted in a non-rotatable manner in relation to the undercarriage.

Such tank containers are frequently used for transporting liquids that consist of several components. When the mobile tank container is stationary, or during transport, said components may separate into lighter and heavier fractions, so that a non-homogeneous product exits the tank container when the tank container is emptied. Moreover, the heat or cold generated upon heating or cooling the product cannot readily spread over the contents because of a local heating or cooling effect and a poor heat transfer in the separated liquid.

In the prior art, stirring devices are placed in the liquid for mixing the liquid. Such stirring devices are heavy, costly and take up a great deal of space, and frequently they project above the circumferential wall, as a result of which the height of the tank container increases, which may be problematic in connection with maximum headroom regulations. Moreover, such devices are difficult to clean and need to be driven electrically. In some cases the stirring device is only placed in the tank container at the unloading site, to which end the tank container must be opened, which affects sterility and which, in addition, is a complex operation.

SUMMARY OF THE INVENTION

The object of the invention is to provide a tank container in which the above drawbacks are at least partially eliminated in a simple and robust manner.

In order to achieve that object, the tank container is provided with a valve gear comprising at least one valve which is movable between an open position and a closed position and which extends into the container volume, such that the valve, when used while the tank container is at least substantially full with liquid, comparitively allows circulation of liquid in the container volume in one tangential circulation direction around the axis or in one axial circulation direction along the axis, or a combination of the two directions, in the open position thereof, and that the valve comparitively impedes circulation of liquid in the opposite circulation direction in the closed position thereof. Since the valve pushes against the liquid upon movement of the tank container in the closed position thereof, the liquid is set in motion and will start to circulate. By opening the valve immediately afterwards, said circulation can be maintained for some time.

Preferably, the valve can move freely between the open position and the closed position as a result of the flow of liquid caused by rotation and/or linear acceleration of the tank container.

The valve gear preferably extends such that the valve is moved to the closed position under the influence of the force of gravity in a condition of rest of the tank container.

The valve is preferably plate-shaped, being pivotally connected to the inner side of the wall of the tank container. The pivot axis preferably extends substantially in axial direction. The pivot axis preferably extends near the inner side of the wall of the tank container.

The valve is preferably connected to the inner side of the circumferential wall.

The valve gear preferably comprises a stop surface that stops the valve at the closed position upon movement from the open position.

The valve gear preferably comprises at least two connecting elements attached to the inner side of the wall of the tank container, between which the valve is pivotally connected. Each connecting element is preferably provided with a stop surface that stops the valve at the closed position upon movement from the open position.

The circumferential wall of the tank container is preferably at least substantially cylindrical.

BRIEF SUMMARY OF THE DRAWINGS

The invention will now be explained with reference to an embodiment shown in the figures, in which:

FIG. 1 is a schematic, perspective cutaway view of a tank container according to the invention; and FIG. 2 is a schematic front view showing a detail of the valve gear in the tank container of FIG. 1.

DESCRIPTION OF THE PREFERRED EMBODIMENTS

According to FIG. 1, a cylindrical tank container comprises a metal circumferential wall 1, which is closed by a metal end wall 2 at both ends (only the rear end wall 2 is shown in the figure). The cylindrical circumferential wall surrounds a container volume intended to be filled with a liquid to be transported. The axis of the cylindrical circumferential wall 1 extends in the driving direction of the tank container.

A valve gear 3 is connected to the inner side of the circumferential wall 1. The valve gear 3 comprises two connecting elements 4, one side of which is welded to the circumferential wall, whilst the other side pivotally holds a plate-shaped valve 5. The valve 5 is shown in two positions in the figures: an open position (A) and a closed position (B).

The plate is provided with two limiters in the form of beams 6, which extend from the side of the valve 5, at an angle of about 90 degrees to the valve, on the pivot side. Mounted on the connecting elements 4 are corresponding stops 7, against which the limiters 6 and the valve strike when the valve 5 moves from the open position to the closed position under the influence of the force of gravity, so that the valve 5 is held in the closed position. A plate-shaped stop 8 is furthermore provided on the connecting elements, parallel to the cylindrical circumferential wall, against which the valve 5 rests in the open position.

When the valve 5 is moved upward as a result of a minor "clockwise" rotational movement of the tank container, a movement in the same direction will be imparted to the liquid in the tank container. When subsequently the tank container rotates in the opposite direction, the liquid flow will cause the valve to pivot upward and the circulation of liquid will be maintained for some time, as a result of which the various components in the liquid will mix.

The embodiment shown herein has one valve gear, but the tank container may comprise several such valve gears, which are designed so that they can set the liquid circulating in one and the same direction or in different directions.

The invention claimed is:

1. A mobile truck tank with a container arranged to transport a liquid, comprising:
   a circumferential wall which extends around a longitudinal axis in a driving direction of the truck and which wall surrounds a container volume; and
   two end walls which, seen in the driving direction, close the container volume at the front side and the rear side thereof,
   wherein the tank container is mounted on a driveable undercarriage of the truck, and
   wherein the tank container is provided with a valve gear comprising:
      at least one valve which is plate-shaped and pivotally connected to an inner side of the circumferential wall of the tank container; and
      a pivot axis configured to extend near the inner side of the wall of the tank container along a longitudinal axial direction of the tank container, the valve gear configured to move between an open position and a closed position and which extends into the container volume, such that the valve, when used while the tank container is at least substantially full with liquid, comparatively allows circulation of liquid in the container volume in one tangential circulation direction around the axis in the open position thereof, and that the valve comparatively impedes circulation of liquid in the opposite circulation direction in the closed position thereof.

2. A mobile truck tank and container according to claim 1, wherein, when used while the tank container is at least substantially full with liquid, the valve can move freely between the open position and the closed position as a result of the flow of liquid caused by rotation and/or linear acceleration of the tank container.

3. A mobile truck tank and container according to claim 1, wherein the valve gear extends such that the valve is moved to the closed position under the influence of the force of gravity in a condition of rest of the tank container.

4. A mobile truck tank and container according to claim 1, wherein the valve gear comprises a stop surface that stops the valve at the closed position upon movement from the open position.

5. A mobile truck tank and container according to claim 1, wherein the valve gear comprises at least two connecting elements attached to the inner side of the wall of the tank container, between which the valve is pivotally connected.

6. A mobile truck tank and container according to claim 5, wherein each connecting element is provided with a stop surface that stops the valve at the closed position upon movement from the open position.

7. A mobile truck tank and container according to claim 1, wherein the circumferential wall of the tank container is at least substantially cylindrical.

8. A mobile truck tank and container according to claim 1, wherein the circumferential wall is mounted in a non-rotatable manner in relation to the undercarriage.

* * * * *